(12) United States Patent
Aoyama

(10) Patent No.: US 8,149,663 B2
(45) Date of Patent: *Apr. 3, 2012

(54) MULTILAYER-OPTICAL-DISC DATA-ERASURE METHOD AND OPTICAL DISC APPARATUS

(75) Inventor: Shohei Aoyama, Mito (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/575,633

(22) Filed: Oct. 8, 2009

(65) Prior Publication Data

US 2010/0091628 A1 Apr. 15, 2010

(30) Foreign Application Priority Data

Oct. 10, 2008 (JP) ................................ 2008-263433

(51) Int. Cl.
*G11B 7/00* (2006.01)

(52) U.S. Cl. .................... 369/47.53; 369/94; 369/47.13; 369/83

(58) Field of Classification Search .................. None
See application file for complete search history.

(56) References Cited

U.S. PATENT DOCUMENTS

| 5,295,125 | A | * | 3/1994 | Oonishi et al. | 369/44.29 |
| 5,414,451 | A | * | 5/1995 | Sugiyama et al. | 347/258 |
| 5,768,221 | A | | 6/1998 | Kasami et al. | |
| 6,574,180 | B2 | * | 6/2003 | Kurokawa et al. | 369/94 |
| 2005/0259552 | A1 | * | 11/2005 | Miura et al. | 369/94 |
| 2007/0258344 | A1 | * | 11/2007 | Rogers et al. | 369/94 |

FOREIGN PATENT DOCUMENTS

JP 09-091700 4/1997

\* cited by examiner

*Primary Examiner* — Jorge L Ortiz Criado
(74) *Attorney, Agent, or Firm* — Antonelli, Terry, Stout & Kraus, LLP.

(57) ABSTRACT

In response to the trend toward the increase in the number of data layers of optical discs, the invention provides a data erasure method and its optical disc apparatus that enable faster data erasures with a simpler configuration. Test erasures are performed on the test areas T of data layers of an optical disc while the power level Pe of data erasure laser light and the defocus amount $\Delta f$ of the data erasure laser light from a target data layer are changed. Based on the results of the test erasures, the optimal erasure condition that enables a simultaneous data erasure from the greatest number of data layers is determined. Based on the determined optimal erasure condition, then, the optimal erasure sequence that enables data erasure from all of the data layers with the fewest number of times is determined.

7 Claims, 3 Drawing Sheets

FIG. 2A

ERASURE PARAMETERS AND
ERASURE JUDGMENTS

| DEFOCUS Δf/d<br>LASER POWER Pe | 0 | 0.25 | 0.5 |
|---|---|---|---|
| 100 (RELATIVE VALUE) | L3 | L3 | – |
| 150 | L3 | L2, L3 | L2, L3 |
| 200 | L2, L3 | L2, L3, L4 | L2, L3 |

FIG. 2B

OPTIMAL ERASURE CONDITION AND
OPTIMAL ERASURE SEQUENCE

| DISC ID | LASER POWER Pe | DEFOCUS AMOUNT Δf RELATIVE TO INTERLAYER DISTANCE d (Δf/d) | TARGET LAYER Lf FOR FOCUS SERVO CONTROL |
|---|---|---|---|
| #0001 | 200 | 0.25 | L2<br>L5 (OR L4) |

MULTILAYER-OPTICAL-DISC DATA-ERASURE METHOD AND OPTICAL DISC APPARATUS

CLAIM OF PRIORITY

The present application claims priority from Japanese patent application serial No. JP2008-263433, filed on Oct. 10, 2008, the content of which is hereby incorporated by reference into this application.

BACKGROUND OF THE INVENTION (1) Field of the Invention

The present invention relates to a data erasure method for a multilayer optical disc having multiple data layers and to an optical disc apparatus.

(2) Description of the Related Art

For the purpose of increasing the storage capacity of optical discs, multilayer optical discs, which each have a laminate structure of multiple data layers, are now being developed. For example, Blu-ray discs (BD), which enable high-density recording, can now have a total storage capacity of up to 400 GB by having 16 data layers each with a storage capacity of 25 GB. Increasing the number of data layers of an optical disc necessitates consideration of how to secure writing/reading capabilities for farther (or deeper) data layers from the light-incident surface of the disc and how to erase data from multiple data layers efficiently. For example, when data is erased from one data layer at a time, the data erasure time increases in proportion to the number of data layers.

For the purpose of initializing (i.e., erasing all data from) a multilayer disc in substantially the same amount of time as in initialization of a single-layer disc, Japanese Unexamined Patent Application Publication No. H09-91700 (Patent Document 1) discloses methods for simultaneously performing initialization on all the data layers by simultaneously radiating laser light onto all the data layers. Disclosed as its light radiation means are multiple optical heads (and multiple objective lenses) that are provided for the respective data layers and each radiate light (see Embodiments 1, 2 and 3). Further disclosed as the light radiation means is a single optical head (and a single objective lens) that radiates light onto multiple data layers with its focal depth being increased (see Embodiment 4).

SUMMARY OF THE INVENTION

In accordance with the methods of Patent Document 1, a multilayer optical disc can be initialized in substantially the same amount of time as in initialization of a single-layer disc. However, the configurations of its Embodiments 1, 2, and 3 require, as the light radiation means, the use of as many optical heads (and objective lens) as the number of data layers. Thus, as the number of data layers increases, the apparatus of Patent Document 1 becomes structurally complex, and its associated component costs also increase. The configuration of Embodiment 4, in contrast, involves the use of a single optical head (and a single objective lens). However, this configuration also has a drawback: even if the focal depth of the optical head is increased, the effective light radiation range of the optical head is limited. Because a multilayer optical disc has a limitation on the number of data layers that can be initialized simultaneously, the configuration of Embodiment 4 is more likely to result in data layers that cannot be initialized sufficiently as the number of data layers increases. If initialization is to be performed each time such data layers occur, this may result in a decrease in data erasure efficiency. The configuration of Embodiment 4 is also prone to a decrease in data writing/reading quality. When the focal depth of the optical head is increased, this makes it difficult to narrow the focal point of its laser light, which also degrades the data writing/reading quality of the apparatus, especially in the case of high-density recording on BDs.

In view of the above problems and in response to the trend toward the increase in the number of data layers of optical discs, an object of the invention is thus to provide a data erasure method and its optical disc apparatus that enable faster data erasures with a simpler configuration.

One aspect of the invention is a data erasure method for a multilayer optical disc having a plurality of data layers, the method comprising the steps of: performing test erasures on test areas of the plurality of data layers of the optical disc by radiating data erasure laser light while changing test erasure conditions; determining an optimal erasure condition that enables a simultaneous data erasure from the greatest number of data layers based on the results of the test erasures; determining an optimal erasure sequence that enables data erasure from all of the plurality of data layers with the fewest number of times based on the determined optimal erasure condition; and erasing existing data from the plurality of data layers based on the determined optimal erasure condition and optimal erasure sequence.

Preferably, as the above test erasure conditions, the power level of the data erasure laser light and the defocus amount of the data erasure laser light from a target data layer are changed.

Preferably, the above step of determining the optimal erasure condition based on the results of the test erasures comprises the steps of: writing dummy data in the test areas of the plurality of data layers from which data has been erased by one of the test erasures; reading the dummy data from the test areas and measuring the jitter or error rates of the read dummy data; and judging the effect of the one of the test erasures on a particular one of the plurality of data layers to be effective when the measured jitter or error rate of dummy data read from the particular one of the plurality of data layers is equal to or less than an acceptable value.

Preferably, the above data erasure method further comprises the step of storing the optimal erasure condition and the optimal erasure sequence on a memory, wherein when data is to be erased again from the optical disc at a later time, the optimal erasure condition and optimal erasure sequence stored on the memory is read, and the data erasure is performed based on the read optimal erasure condition and optimal erasure sequence.

Another aspect of the invention is an optical disc apparatus that performs data writing, reading, and erasure on a multilayer optical disc having a plurality of data layers, the apparatus comprising: an optical head for radiating laser light onto the optical disc to perform data writing, reading, and erasure; a laser power setup unit for setting the power level of data erasure laser light radiated by the optical head; a defocus amount setup unit for setting a defocus amount for the optical head so that the focus position of the data erasure laser light is displaced from a target data layer by the defocus amount; a data-reading evaluation unit for evaluating the quality of data read from the optical disc; a microcomputer for instructing the optical head to perform test erasures on test areas of the plurality of data layers of the optical disc under various test erasure conditions and determining, based on the results of the test erasures, an optimal erasure condition that enables a simultaneous data erasure from the greatest number of data layers and an optimal erasure sequence that enables data erasure from all of the plurality of data layers with the fewest number of times; and a memory for storing the optimal erasure condition and the optimal erasure sequence. In order to erase existing data from the plurality of data layers, the microcomputer performs the following operations: 1) instruct the optical head to perform the test erasures while instructing the laser power setup unit to change the power level of the data erasure laser light and the defocus amount setup unit to change the defocus amount; 2) instruct the optical head to write dummy data in the test areas of the plurality of data layers from which data has been erased by one of the test erasures; 3) instruct the data-reading evaluation unit to measure the jitter or error rates of the dummy data read from the test areas by the optical head; 4) judge the effect of the one of the test erasures on a particular one of the plurality of data layers to be effective when the measured jitter or error rate of dummy data read from the particular one of the plurality of data layers is equal to or less than an acceptable value; 5) determine, based on the results of the test erasures, the optimal erasure condition and the optimal erasure sequence; and 6) instruct the optical head to erase existing data from the plurality of data layers based on the determined optimal erasure condition and optimal erasure sequence.

In accordance with the invention, data erasure from a multilayer optical disc can be performed in a small amount of time with a structurally simpler apparatus.

BRIEF DESCRIPTION OF THE DRAWINGS

These and other features, objects, and advantages of the present invention will become more apparent from the following description when taken in conjunction with the accompanying drawings wherein:

FIGS. 2A and 2B are tables showing examples of test erasure conditions and test erasure judgments.

DETAILED DESCRIPTION OF THE PREFERRED EMBODIMENTS

A data erasure method according to an embodiment of the invention involves the steps of performing test erasures on the test areas of data layers of an optical disc while changing erasure conditions and determining an optimal erasure condition that enables a simultaneous data erasure from the greatest number of data layers and an optimal erasure sequence that enables data erasure from all of the data layers with the minimum number of times. The data erasure method further includes the step of erasing data from all of the data layers with the minimum number of times (including 1) based on the optimal erasure condition and the optimal erasure sequence. The data erasure method also includes the step of storing the optimal erasure condition and the optimal erasure sequence so that these are used when data is erased again from the optical disc at a later time.

Figure 1:
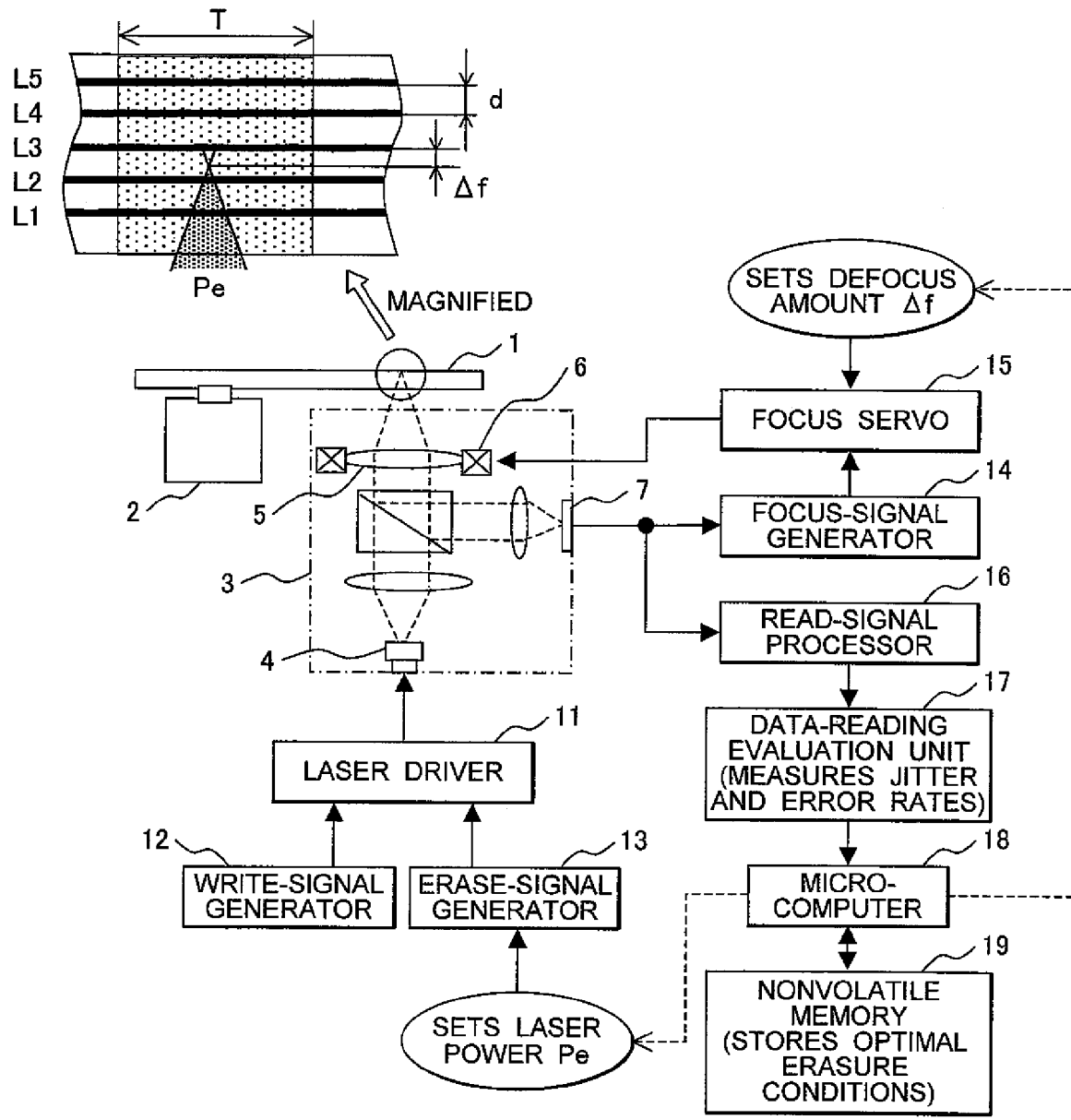
FIG. 1 illustrates a data erasure method for a multilayer optical disc and an optical disc apparatus according to an embodiment of the invention.

FIG. 1 illustrates the data erasure method for a multilayer optical disc and an optical disc apparatus according to the embodiment of the invention.

FIG. 1 shows an optical disc 1, or a 5-layered rewritable disc. The data layers of the optical disc 1 are, from its laser-light-incident side, L1, L2, L3, L4, and L5, and the interlayer distances are each indicated by the letter 'd.' The following explanation is based on the assumption that each of the data layers holds data and that all the data is to be erased from all of the data layers. Note that the test areas T of the data layers are used for test erasures.

By rotating the optical disc 1 with the use of a spindle motor 2 and radiating laser light onto the data layers with the use of an optical head 3, data is written on, read from, or erased from the optical disc 1. The optical head 3 includes a laser light source 4 that generates laser light with laser power Pe; an objective lens 5 that focuses the laser light on a particular data layer; an actuator 6 that moves the objective lens 5 in thickness directions of the optical disc 1 and in radially inward and outward directions of the optical disc 1; a photodetector 7 that detects light reflected from the optical disc 1 and converts the reflected light into an electrical signal; and the like. The objective lens 5 has a particular numerical aperture (NA), which value is set based on the format of the recording medium, or the optical disc 1. For example, the NA of a Blu-ray disc is typically set at 0.85 to ensure a small focal depth and hence high-density recording. The optical head 3 is moved by a sled motor (not illustrated) in a radially inward or outward direction of the optical disc 1 such that the optical head 3 faces a particular area (a particular radial position) of the optical disc 1. A laser driver 11 transmits a drive signal to the laser light source 4. A write-signal generator 12 generates a write signal based on a write strategy and also generates dummy data upon test erasure. An erase-signal generator 13 generates an erase signal that specifies a particular laser power level Pe.

A detection signal from the photodetector 7 is transmitted to a focus-signal generator 14 and to a write-signal processor 16. The focus-signal generator 14 generates a focus error (FE) signal from the detection signal. A focus servo 15 drives the actuator 6 to perform focus control. During the focus control, an offset is imparted to the focus servo 15 so that the focus position of laser light is displaced from the exact focus position on a target data layer by a particular amount. This displacement amount is herein referred to as a defocus amount Δf. Instead of imparting the offset, the defocus amount Δf can also be produced by changing the FE signal generated by the focus-signal generator 15. During test erasure, the defocus amount Δf and the laser power Pe of the laser light source 4 are used as its parameters to erase data from the test areas T of the data layers.

The write-signal processor 16 reads data from the detection signal received from the photodetector 7. A data-reading evaluation unit 17 evaluates the quality of the read data. More specifically, after a test erasure, the data-reading evaluation unit 17 evaluates the quality of dummy data which is recorded after the test erasure by measuring the jitter or error rate of the dummy data read by the write-signal processor 16 and transmits the result to a microcomputer 18. When the measured jitter or error rate is equal to or less than an acceptable value, the microcomputer 18 judges the test erasure "effective." If not, the microcomputer 18 judges the test erasure "not effective." The judgment result of the detest erasure is stored on a nonvolatile memory 19. Based on the test erasure judgment result, the microcomputer 18 also determines the optimal erasure condition (parameters) that enables a simultaneous data erasure from the greatest number of data layers. In addition, the microcomputer 18 determines, based on the optimal erasure condition determined, the optimal erasure sequence that enables data erasure from all of the data layers with the minimum number of times (the optimal erasure sequence can be paraphrased as target data layers on which focus servo control is to be performed). With the use of the optimal erasure condition and optimal erasure sequence, data can be erased from all of the data layers with the minimum number of times (including 1). The nonvolatile memory 19 stores the optimal erasure condition and optimal erasure sequence so that they can be used for the next data erasure.

The optical disc apparatus of this embodiment is structurally simple in that it has a single optical head 3 and a single objective lens 5 and can also be applied to multilayer discs whose data layers are more than five. Further, since the focal depth of laser light is set small enough, the data writing/reading capabilities of the optical disc apparatus are not affected by the focal depth.

During test erasure, test erasure laser light is radiated onto the test areas T of the data layers of the optical disc 1, thereby determining the number of data layers from which data can be erased simultaneously. In this case, by locking the focus of the laser light onto a middle layer (the third layer L3 in the case of the 5-layered optical disc 1), test erasure results can be obtained for both of the upper layers above and the lower layers below the middle layer. The test areas T of the data layers are, in this case, data areas of several blocks and located at the same radial position of the optical disc 1. The test erasure is repeated for as many test erasure conditions as there are. Each time the test erasure is performed, different test areas T or the same test areas T can be used.

FIGS. 2A and 2B are tables showing examples of test erasure conditions and test erasure judgments. More specifically, FIG. 2A shows test erasure parameters and test erasure judgments, and FIG. 2B shows the optimal erasure condition and optimal erasure sequence.

As shown in the example of FIG. 2A, the parameters used upon test erasure are DC (direct-current) erase laser powers Pe of 100, 150, and 200 (relative values) and defocus amounts $\Delta f$ relative to the interlayer distance d, i.e., $\Delta f/d$ of 0, 0.25, and 0.5. Those two kinds of parameter sets are combined to examine the optimal combination, i.e., the optimal erasure condition.

After a test erasure is performed with the use of one set of a laser power value Pe and a defocus amount $\Delta f$, the erasure effect on each data layer is judged. To judge the erasure effect, dummy data is first recorded in the test areas T from which data has been erased by the test erasure. The dummy data can be data having a particular pattern or randomly created data as in optimum power control (OPC). The recorded dummy data is then read, and its quality is evaluated. More specifically, the data-reading evaluation unit 17 measures the jitter or error rate of the dummy data read. When the measurement value is equal to or less than an acceptable value, the test erasure can be judged "effective."

The table of FIG. 2A shows all parameter combinations, and their results each show a data layer(s) in which test erasure was judged "effective." For example, when Pe=100 and $\Delta f/d$=0, only the data layer L3 was judged as "erasure effective." When Pe=200 and $\Delta f/d$=0.25, on the other hand, the data layers L2, L3, and L4 were judged as "erasure effective." Accordingly, the optimal erasure condition that enables a simultaneous data erasure from the greatest number of data layers is when Pe=200 and $\Delta f/d$=0.25, as shown in FIG. 2B. In this case, the number (N) of data layers from which data can be erased simultaneously is three. In order to erase data from the all the data layers with the minimum number of times based on the above optimal erasure condition, data is first erased from the data layers L1, L2, and L3 by setting the data layer L2 as a first target layer Lf on which focus servo control is to be performed. Data is erased next from the data layers L4 and L5 by setting the data layer L4 or L5 as a second target layer Lf on which focus servo control is to be performed next. The above sequence is determined as the optimal erasure sequence. The optimal erasure condition and optimal erasure sequence are stored on the nonvolatile memory 19 together with the ID (#0001) of the optical disc 1, and actual data erasure is performed based on those.

Figure 3:
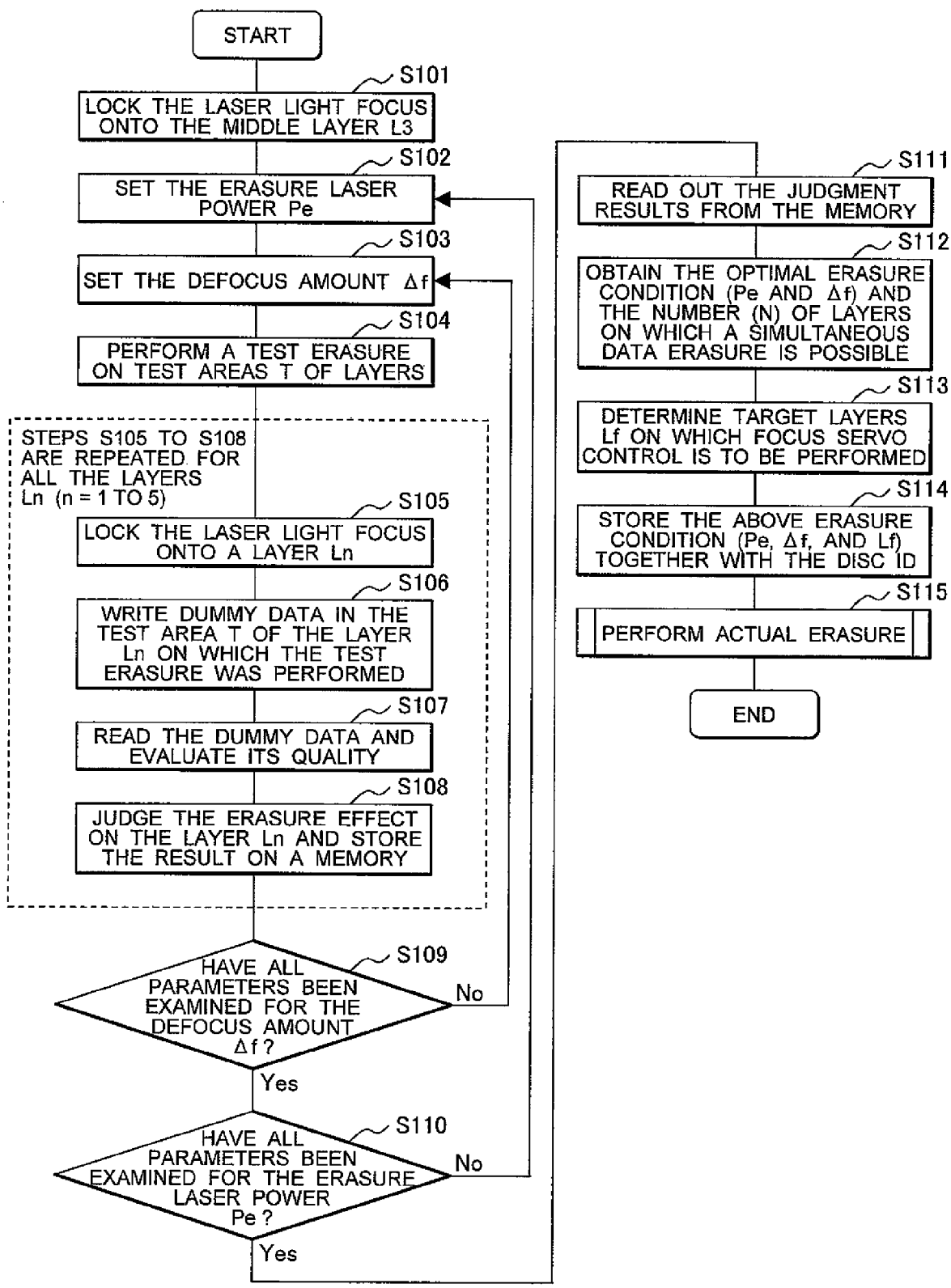
FIG. 3 is a flowchart illustrating the process flow of the data erasure method according to the embodiment.

FIG. 3 is a flowchart illustrating the data erasure method of the thus-far described embodiment, which method is applied to the 5-layered optical disc 1 as in FIGS. 1, 2A, and 2B. The following process flow is controlled by the microcomputer 18 based on a program.

In Step S101, focus servo control is performed on the middle data layer L3.

In Step S102, the test erasure laser power Pe of the optical head 3 is set at, for example, a relative value of 100, which is one of the predetermined test erasure parameters.

In Step S103, the defocus amount $\Delta f$ for the focus servo 15 is set at one of the predetermined test erasure parameters (for example, $\Delta f/d$=0).

In Step S104, the optical head 3 is moved to face the test areas T of the data layers, and a test erasure is performed on the test areas T with the use of the above two parameters.

Steps S105 to S108 are performed to judge the test erasure effects on the respective data layers Ln (n=1 to 5).

In Step S105, focus servo control is performed on a data layer Ln.

In Step S106, dummy data is written on the test area T of the data layer Ln from which data has been erased by the test erasure.

In Step S107, the dummy data is read, and its quality is evaluated. More specifically, the jitter or error rate of the read dummy data is measured.

In Step S108, if the evaluated quality is within an acceptable range, the test erasure is judged "effective," and the result is stored on the nonvolatile memory 19. Thereafter, the process returns to Step S105 to judge the test erasure effect on another data layer Ln.

Step S109 is to judge whether all the parameters have been examined for the defocus amount $\Delta f$. If not, the process returns to Step S103 to set the defocus amount $\Delta f$ at another value.

Step S110 is to judge whether all the parameters have been examined for the test erasure laser power Pe. If not, the process returns to Step S102 to set the laser power Pe at another value.

Step S111 is to read from the nonvolatile memory 19 the test erasure judgment results obtained with all the sets of parameters.

Step S112 is to obtain the optimal erasure condition (Pe and $\Delta f$) that enables a simultaneous data erasure from the greatest number of data layers and the number (N) of data layers from which data can be erased simultaneously. In the example of FIG. 2B, Pe=200, $\Delta f/d$=0.25, and N=3.

Step S113 is to determine target data layers Lf on which focus servo control is to be performed as the optimal erasure sequence that enables data erasure from all of the data layers with the minimum number of times. In the example of FIG. 2B, Lf=L2 and either L5 or L4.

In Step S114, the optimal erasure condition and optimal erasure sequence (Pe, $\Delta f$, and Lf) are stored on the nonvolatile memory 19 together with the ID of the optical disc 1.

In Step S115, actual data erasure is performed on all the data layers of the optical disc 1 based on the optimal erasure condition and optimal erasure sequence (Pe, $\Delta f$, and Lf).

As above, the present embodiment is designed to perform test erasures for the purpose of obtaining the optimal erasure condition that enables a simultaneous data erasure from the greatest number of data layers and determining, based on the optimal erasure condition, the optimal erasure sequence that enables data erasure from all of the data layers with the minimum number of times (i.e., target data layers on which focus servo control is to be performed). Therefore, actual data erasure (Step S115) can be performed most efficiently in the least amount of time. Because the actual data erasure is based on the results of the test erasures, it is less prone to erasure failure and thus highly reliable. Although the present embodiment involves the steps of performing test erasures and judging the erasure effects, those steps take only a small amount of time, for the test areas T used for those steps are considerably small in area.

The above-described embodiment can be applied not only to data erasure from all data layers but to data erasure from particular data layers. In that case, the target data layers on which focus servo control is to be performed should be changed to determine another optimal erasure sequence.

When data is to be erased again from the optical disc 1 at a later time, that erasure can be performed in the least amount of time without test erasures by reading, in Step S114, the optimal erasure condition and sequence stored on the nonvolatile memory 19 together with the ID of the optical disc 1. It should be noted that the optimal erasure condition and sequence can be stored on the information management area of the optical disc 1, instead of being stored on the nonvolatile memory 19 of the optical disc apparatus, so that such information can be read from the information management area of the optical disc 1.

The data erasure method of the above-described embodiment can also be applied to non-rewritable, write-once discs such as DVD-R. In that case, overwriting is performed on the existing data of such a disc with erase power. Thus, the existing data can be destroyed in a small amount of time.

While we have shown and described several embodiments in accordance with our invention, it should be understood that the disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. A data erasure method for a multilayer optical disc having a plurality of data layers, the method comprising the steps of:
    performing test erasures on test areas of the plurality of data layers of the optical disc by radiating data erasure laser light while changing test erasure conditions;
    determining an optimal erasure condition that enables a simultaneous data erasure from the greatest number of data layers based on the results of the test erasures;
    determining an optimal erasure sequence that enables data erasure from all of the plurality of data layers with the fewest number of times based on the determined optimal erasure condition; and
    erasing existing data from the plurality of data layers based on the determined optimal erasure condition and optimal erasure sequence.

2. The data erasure method defined in claim 1,
    wherein the power level of the data erasure laser light and the defocus amount of the data erasure laser light from a target data layer are changed as the test erasure conditions.

3. The data erasure method defined in claim 1,
    wherein the step of determining the optimal erasure condition based on the results of the test erasures comprises the steps of:

writing dummy data in the test areas of the plurality of data layers from which data has been erased by one of the test erasures;
    reading the dummy data from the test areas and measuring the jitter or error rates of the read dummy data; and
    judging the effect of the one of the test erasures on a particular one of the plurality of data layers to be effective when the measured jitter or error rate of dummy data read from the particular one of the plurality of data layers is equal to or less than an acceptable value.

4. The data erasure method defined in claim 1,
    the method further comprising the step of storing the optimal erasure condition and the optimal erasure sequence on a memory,
        wherein when data is to be erased again from the optical disc at a later time, the optimal erasure condition and optimal erasure sequence stored on the memory is read, and the data erasure is performed based on the read optimal erasure condition and optimal erasure sequence.

5. An optical disc apparatus that performs data writing, reading, and erasure on a multilayer optical disc having a plurality of data layers, the apparatus comprising:
    an optical head for radiating laser light onto the optical disc to perform data writing, reading, and erasure;
    a laser power setup unit for setting the power level of data erasure laser light radiated by the optical head;
    a defocus amount setup unit for setting a defocus amount for the optical head so that the focus position of the data erasure laser light is displaced from a target data layer by the defocus amount;
    a data-reading evaluation unit for evaluating the quality of data read from the optical disc;
    a microcomputer for instructing the optical head to perform test erasures on test areas of the plurality of data layers of the optical disc under various test erasure conditions and determining, based on the results of the test erasures, an optimal erasure condition that enables a simultaneous data erasure from the greatest number of data layers and an optimal erasure sequence that enables data erasure from all of the plurality of data layers with the fewest number of times; and
    a memory for storing the optimal erasure condition and the optimal erasure sequence,
    wherein: the microcomputer instructs the optical head to perform the test erasures while instructing the laser power setup unit to change the power level of the data erasure laser light and the defocus amount setup unit to change the defocus amount;
    the microcomputer instructs the optical head to write dummy data in the test areas of the plurality of data layers from which data has been erased by one of the test erasures;
    the microcomputer instructs the data-reading evaluation unit to measure the jitter or error rates of the dummy data read from the test areas by the optical head;
    the microcomputer judges the effect of the one of the test erasures on a particular one of the plurality of data layers to be effective when the measured jitter or error rate of dummy data read from the particular one of the plurality of data layers is equal to or less than an acceptable value;
    the microcomputer determines, based on the results of the test erasures, the optimal erasure condition and the optimal erasure sequence; and the microcomputer instructs the optical head to erase existing data from the plurality of data layers based on the determined optimal erasure condition and optimal erasure sequence.

6. A data erasure method for a multilayer optical disc having a plurality of data layers, the method comprising the steps of:

setting a defocus amount to an actuator;

performing a test erasures on test areas of the plurality of data layers of the optical disc by radiating data erasure laser light under the defocus conditions;

determining an optimal erasure condition that enables a simultaneous data erasure from the greatest number of data layers based on the results of the test erasures;

determining an optimal erasure sequence that enables data erasure from all of the plurality of data layers with the fewest number of times based on the determined optimal erasure condition;

writing data in the test areas where the test erasures are performed; and erasing existing user data from the plurality of data layers after the data writing step.

7. An optical disc apparatus that performs data writing, reading, and erasure on a multilayer optical disc having a plurality of data layers, the apparatus comprising:

an optical head for radiating laser light onto the optical disc to perform data writing, reading and erasure;

a laser power setup unit for setting the power level of data erasure laser light radiated by the optical head;

a defocus amount setup unit for setting a defocus amount for the optical head so that the focus position of the data erasure laser light is displaced from a target data layer by the defocus amount; and a microcomputer for instructing the optical head to perform test erasures on test areas of the plurality of data layers of the optical disc, determining, based on the results of the test erasures, an optimal erasure condition that enables a simultaneous data erasure from the greatest number of data layers and an optimal erasure sequence that enables data erasure from all of the plurality of data layers with the fewest number of times and instructing the optical head to erase existing data from the plurality of data layers, wherein the microcomputer controls the defocus amount setup unit to set the defocus conditions, instructs the optical head to perform test erasures on test areas of the plurality of data layers of the optical disc by radiating data erasure laser light under the defocus conditions, instructs the optical head to perform writing data in the test areas where the test erasures are performed, and instructs the optical head to perform erasing existing user data from the plurality of data layers after the data writing by controlling the laser power setup unit.

* * * * *